Oct. 6, 1925.

E. E. CLEMENTS 1,556,423

MACHINE FOR PREPARING COATED STRIPS

Filed Oct. 5, 1923     6 Sheets-Sheet 1

Inventor
EUGENE E. CLEMENTS

By his Attorney

Oct. 6, 1925.
E. E. CLEMENTS
1,556,423
MACHINE FOR PREPARING COATED STRIPS
Filed Oct. 5, 1923 6 Sheets-Sheet 2
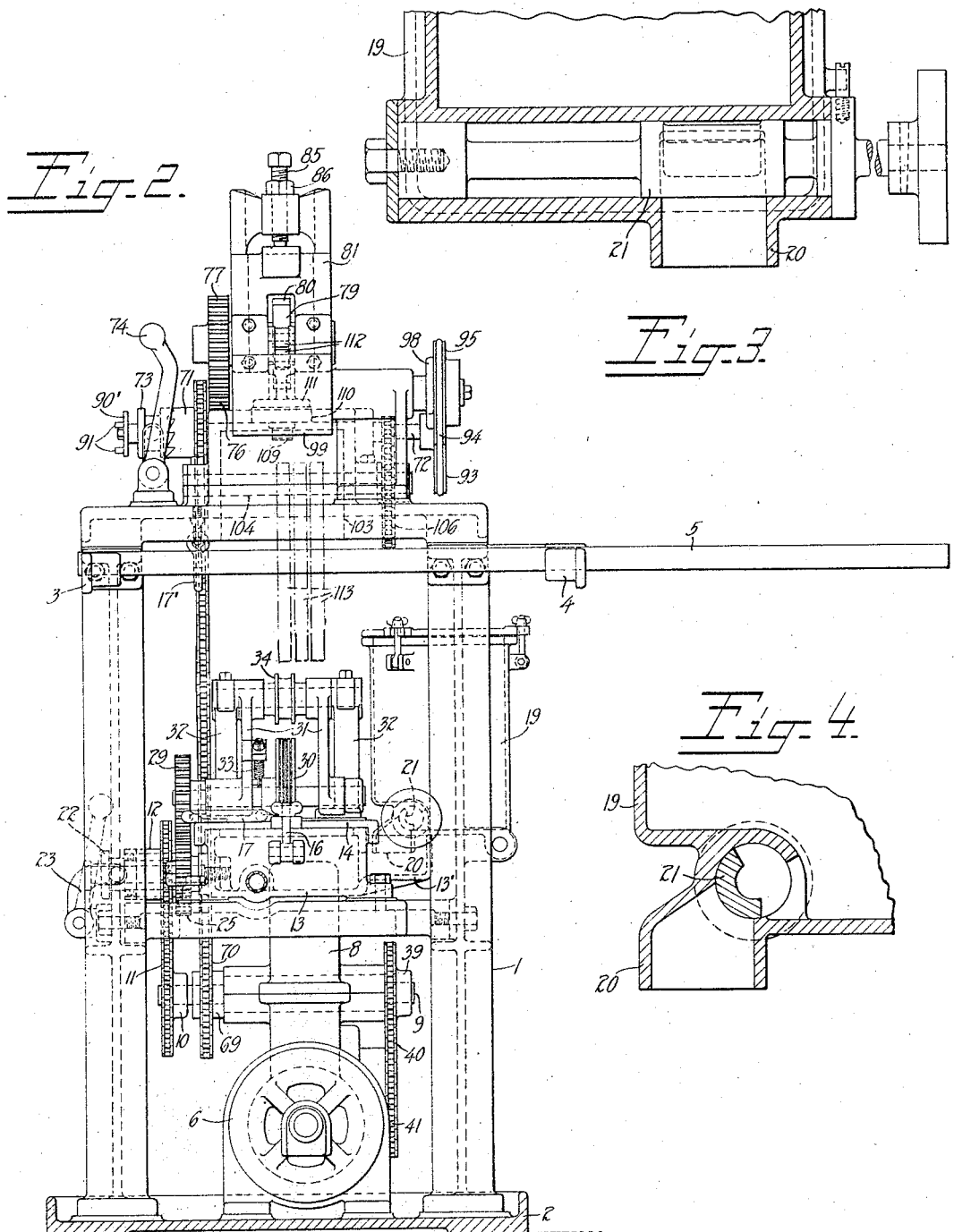
Inventor
EUGENE E. CLEMENTS
By his Attorney

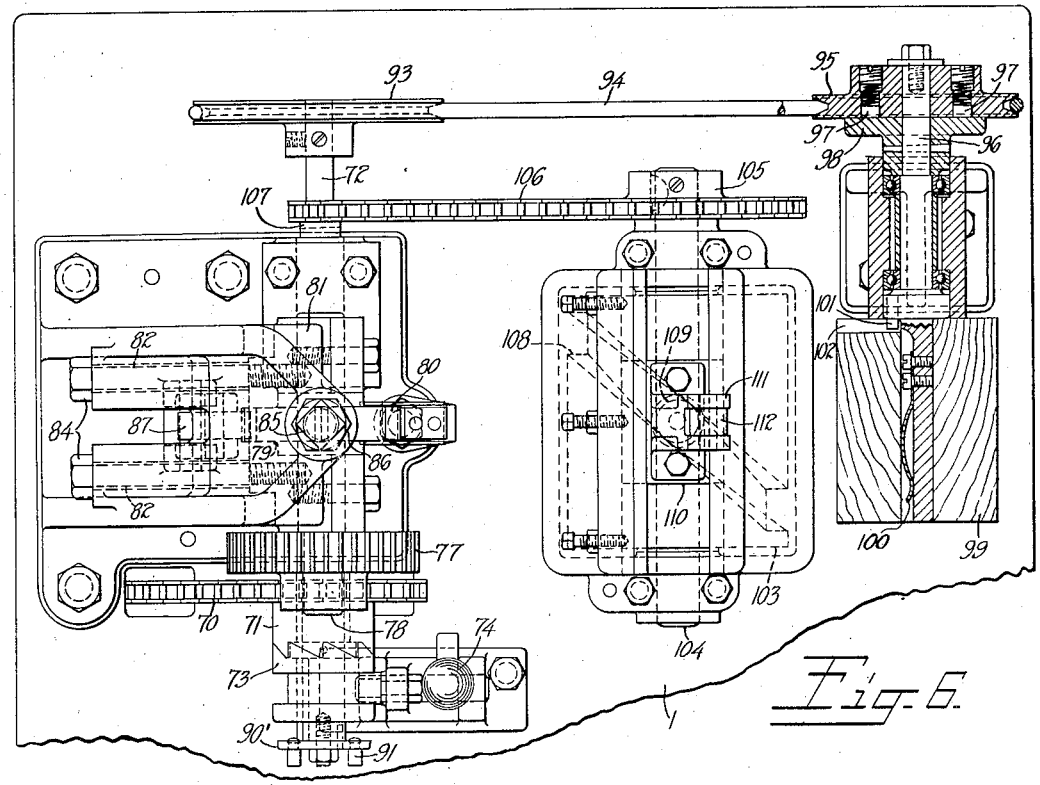

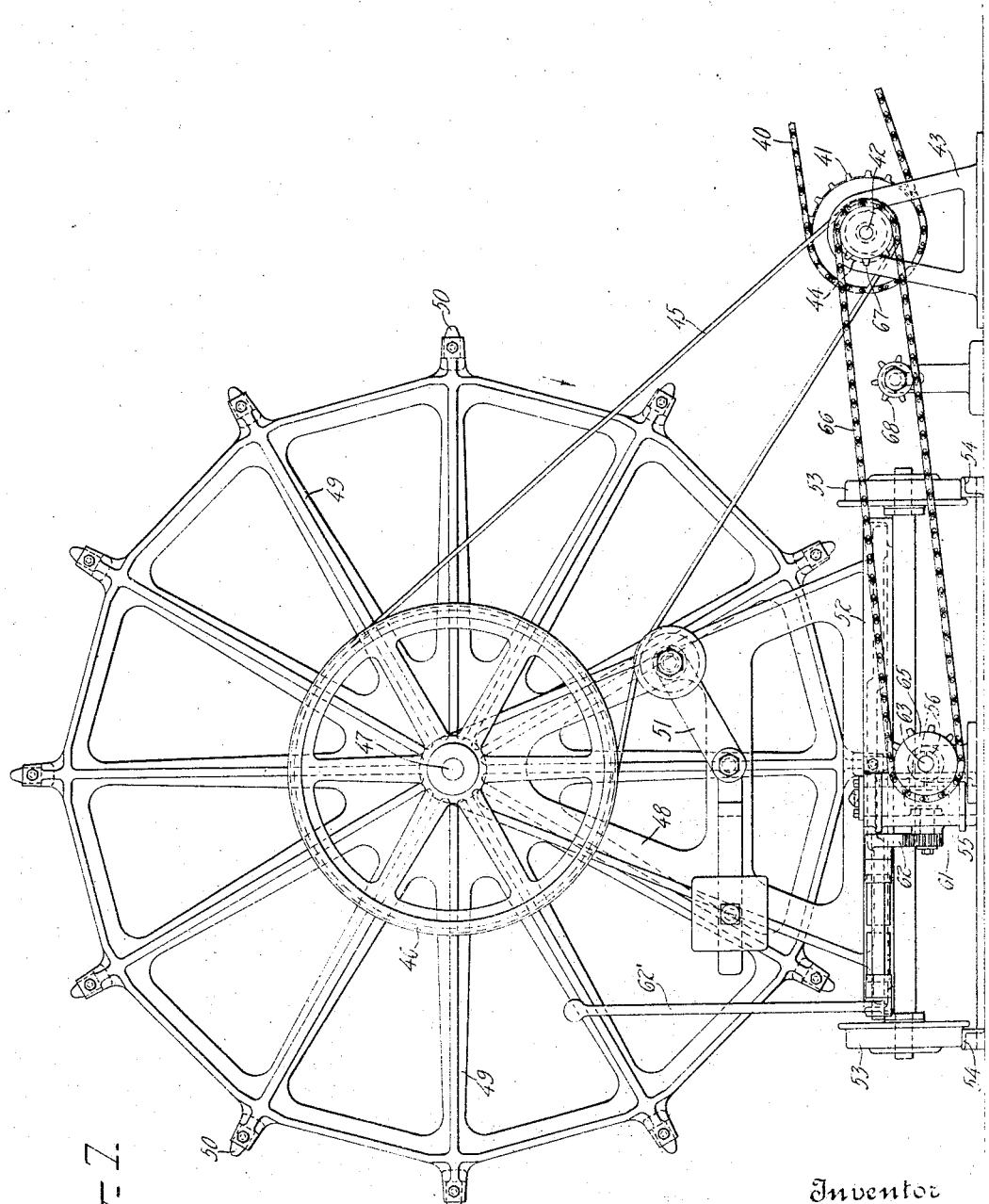

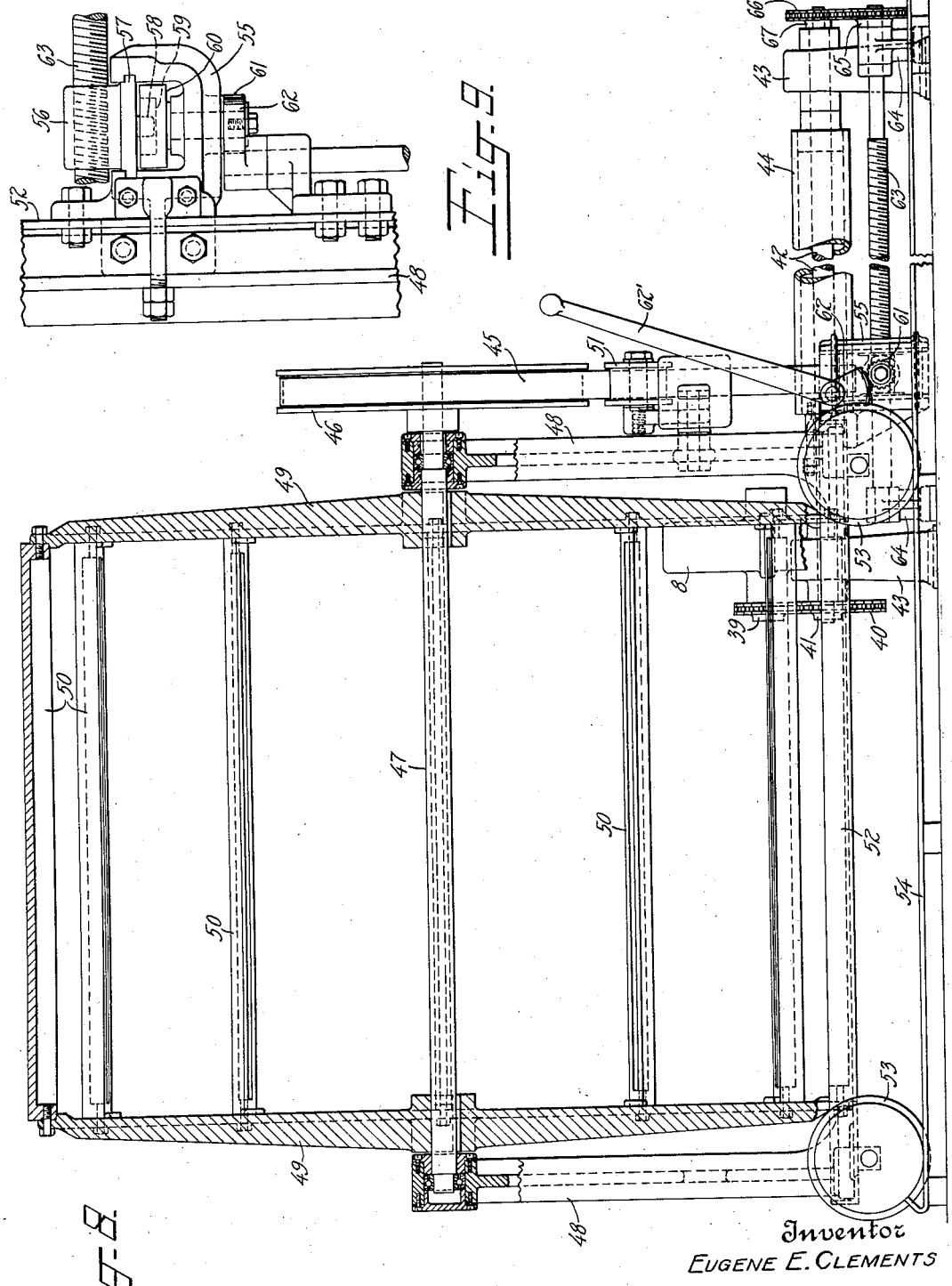

Oct. 6, 1925.
E. E. CLEMENTS
1,556,423
MACHINE FOR PREPARING COATED STRIPS
Filed Oct. 5, 1923    6 Sheets-Sheet 6
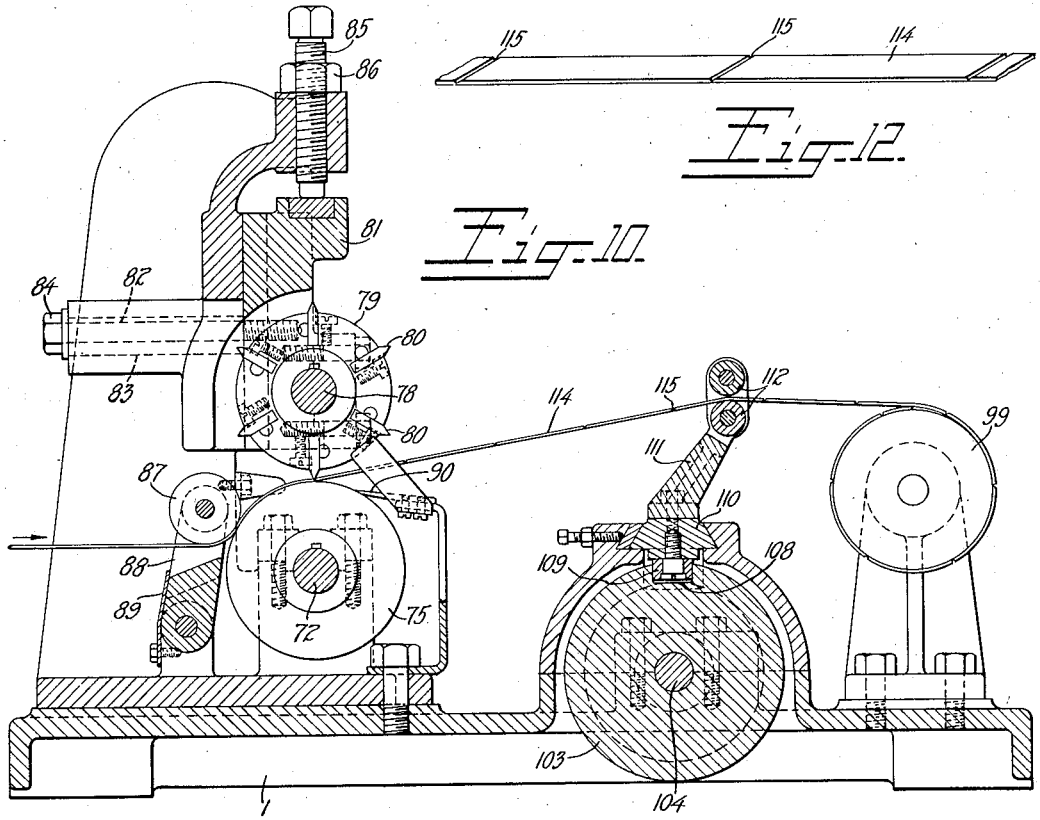
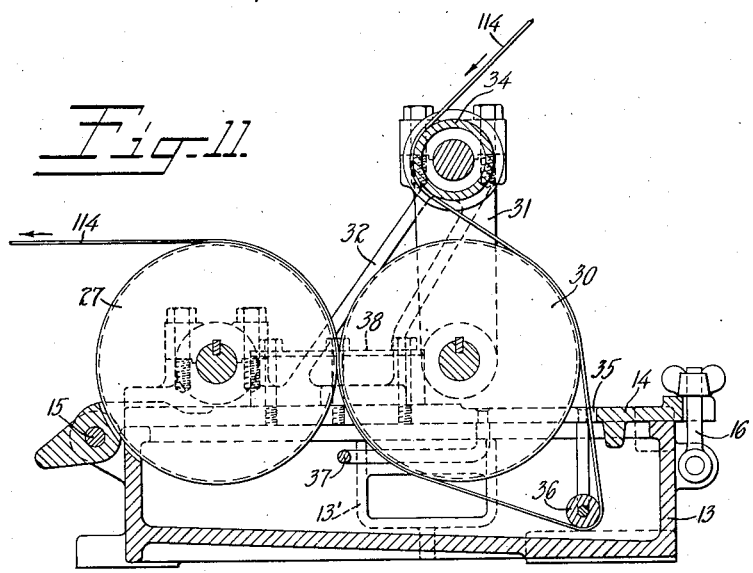
Inventor
EUGENE E. CLEMENTS
By his Attorney Patented Oct. 6, 1925.

1,556,423

UNITED STATES PATENT OFFICE.

EUGENE E. CLEMENTS, OF NEW HAVEN, CONNECTICUT, ASSIGNOR TO L. CANDEE & COMPANY, OF NEW HAVEN, CONNECTICUT, A CORPORATION OF CONNECTICUT.

MACHINE FOR PREPARING COATED STRIPS.

Application filed October 5, 1923. Serial No. 666,726.

*To all whom it may concern:*

Be it known that I, EUGENE E. CLEMENTS, a citizen of the United States, and a resident of New Haven, county of New Haven, and State of Connecticut, have invented certain new and useful Improvements in a Machine for Preparing Coated Strips, of which the following is a full, clear, and exact description.

This invention relates to a machine for preparing coated strips, more particularly to a machine for preparing rubberized fabric strips for use as buckle straps in rubber footwear.

Certain articles of rubber footwear such as arctics are provided with buckles for fastening them, which buckles are ordinarily secured in position by inserting through the loop of the buckle a strap of rubberized fabric, the ends of which strap are then doubled over and inserted between the plies of the footwear article as the latter is built up, and finally vulcanized in position. Prior to my invention it has been necessary to manually prepare these straps by cementing a fabric strip, allowing it to stand until sufficiently dry, and then cutting to the desired length, which is a time consuming and expensive method.

An object of my invention is to reduce the cost of making rubber footwear.

Another object is to provide a substantially automatic machine for preparing coated strips.

Another object is to provide a machine for rubber cementing a fabric strip, drying the latter, and scoring it at intervals so that it may be readily separated into the desired lengths.

Broadly the invention comprises means for cementing or otherwise coating both sides of a strip, means for drying the strip, means for regularly scoring the dried strip to facilitate its separation into desired lengths, and means for winding up the scored strip.

For a detailed description of the invention, reference is had to the accompanying specification and drawings, in which latter:

Figure 2 is a partial front elevation;

Figure 3 is a longitudinal section of a valve;

Figure 4 is a transverse section thereof;

Figure 5 is a plan of the cementing or coating mechanism;

Figure 6 is a plan, partially in section, of the scoring and wind-up mechanisms;

Figure 7 is a side elevation of the drying mechanism;

Figure 8 is a front elevation, partially in section, of the latter;

Figure 9 is a detail plan of a split nut device;

Figure 10 is a longitudinal section of the scoring and wind-up mechanisms;

Figure 11 is a longitudinal section of the cementing mechanism, and

Figure 12 is a perspective of the finished strip.

Figure 1:
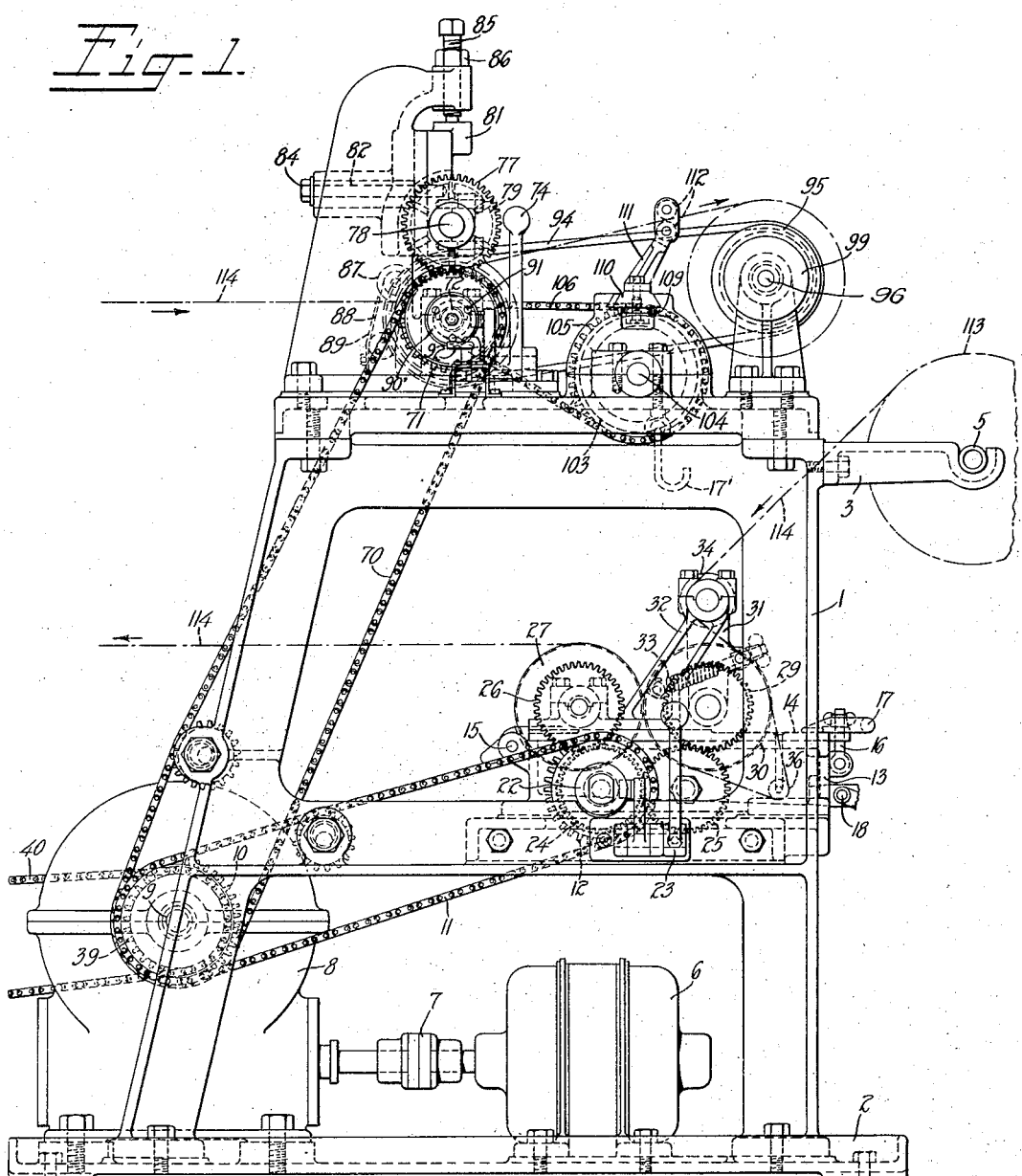
Figure 1 is a partial side elevation of the machine with certain parts omitted for the sake of clearness.

Referring to the drawings, the numeral 1 designates the frame of the machine mounted on a base 2. Projecting from the front of the frame at its upper portion are two bracket arms 3 and 4 provided with recesses for the reception of an arbor 5 for the stock reels of the material to be operated upon. While the machine may be driven in any suitable manner, in the present instance an electric motor 6 is provided the shaft of which is connected by a flexible joint 7 with any form of speed reducing gear 8 through which the main shaft 9 of the machine is driven.

*Cementing mechanism.*—Mounted on one end of the shaft 9 is a sprocket 10, which through the chain 11 drives a sprocket 12, mounted on the side of a cement tank 13 (Figs. 1 and 2). The tank is provided with a filling extension 13′, and with a cover 14 hinged at 15 and secured in closed position by the pivot bolt 16 (Fig. 5). Adjacent the front end the cover is provided with a handle 17, and the cover may be held in raised or open position by engaging the handle with the hook 17′. In order to drain the tank when necessary it is provided at the bottom of its front portion with a drain cock 18. Cement is supplied to the tank from a reservoir 19, as shown in Fig. 2, the lower end of which is provided with a nozzle 20 projecting into the extension 13′ of the tank, which nozzle is controlled by the valve 21. A clutch 22 controlled by the handle 23 is provided for connecting the sprocket 12 in driving relation to a gear 24 which meshes with a gear 25 at one side and also with a gear 26 disposed above it, which latter gear is rigid on the shaft of a feed roll 27 mounted on the cover 14 and projecting into the tank through the cover. As shown in Fig. 5 the feed roll is relatively narrow, its width depending upon the width of the strip to be cemented, and on its periphery it is provided with the knurled ridges 28. The gear 25 meshes with a gear 29 rigid on the shaft of a second knurled feed roll 30. This latter roll is not fixedly carried by the cover 14 but is journalled in arms 31 pivotally connected at their upper ends to brackets 32 projecting upwardly from the cover. In order to yieldingly urge the roll 30 toward the roll 27 a coiled spring 33 is provided, which is secured at one end to one of the bracket arms 32 and adjustably connected at the other end to a swinging arm 31. Mounted on the pivot pin or shaft of the swinging arms 31 is a small strip guiding roll 34, and the strip to be cemented or coated after passing around this roll is led across the rear side of the feed roll 30, down through the opening 35 in the cover of the tank, around the spacing and guide roll 36 disposed within the tank, and then passes up between the rolls 27 and 30, between which within the tank a guide bar 37 is disposed (Figs. 5 and 11). In order to remove surplus cement, adjustable scraper plates 38 are mounted on the cover 14 at the sides of the rolls 27 and 30.

*Drying mechanism.*—Secured on the main drive shaft 9 at the end opposite the sprocket 10 is a sprocket 39 which through the chain 40 drives a sprocket 41 on the main shaft 42 of the drying mechanism, said shaft being mounted in brackets 43 (Figs. 7 and 8). Rigidly secured on the shaft 42 is a belt drum 44, which by means of a belt 45 drives a pulley 46 disposed on a shaft 47 journalled in brackets 48. Secured to the shaft 47 are spaced spiders 49 which are connected at intervals on their peripheries by bars 50 to form a drying reel. In order to maintain the proper tension on the belt 45 a counterpoise 51 is provided, which is pivotally mounted on one of the brackets 48. The brackets 48 are mounted on a carriage 52 provided with wheels 53 running on tracks 54, so that the carriage and supported drying reel may be moved laterally. In order to provide for such lateral movement a split nut and screw mechanism is used. The split nut device, designated generally by the numeral 55, is secured to the carriage 52, and as it is of well-known construction will therefore be only briefly described. Mounted in the main body of the split nut device are the upper and lower nut halves 56 (see Figures 7 and 9) each of which is provided at its rear end with a slide 57 vertically movable in the main body of the device. Projecting rearwardly from each slide 57 is a pin 58, which pins are movable in cam grooves 59 cut in the side face of a rotatable cam 60, the stub shaft of which cam is provided at its other end with a pinion 61 engaging a segment 62 operable by the handle 62′. The split nut when in closed position engages the threads of a screw shaft 63 mounted in brackets 64, one end of said shaft being provided with a sprocket 65 which is driven by the chain 66 from a sprocket 67 on shaft 42. The tension of the chain 66 may be regulated by means of the adjustable idler sprocket 68.

*Cutting mechanism.*—On the main drive shaft 9 is a sprocket 69 which through the chain 70 drives a sprocket 71 freely rotatable on a shaft 72 journalled in the upper part of the machine. A clutch 73 operable through the handle 74 is provided for connecting the sprocket 71 in driving relation to the shaft 72. Keyed on the shaft 72 is a roll 75 (Fig. 10) forming one member of a score cutting device. Also rigid on said shaft is a gear 76 meshing with a gear 77 rigid on a shaft 78, and secured to shaft 78 is a circular plate 79 in which are mounted at regular intervals score cutting blades 80, the number of which will be varied in accordance with the length to which it is desired to cut the finished strip. In order to regulate the depth of the score cut the shaft 78 is mounted in a slide 81 which is secured to the frame of the machine by bolts 82 disposed in elongated adjusting openings 83 in the frame, the bolts being held in adjusted position by the nuts 84. The slide 81, upon loosening the nuts 84, may be adjusted by means of the screw 85 provided with a lock nut 86. Cooperating with the roll 75 to feed the strip is a small idler roll 87 pivotally carried on the frame of the machine by means of the arms 88, said roll being urged toward the roll 75 by the leaf spring 89 engaging an arm 88. In order to prevent sticking of the scored strip to the roll 75 a stripper 90 bears against the latter slightly beyond the point at which the score cutters operate against it. Secured on one end of shaft 72 is a disc 90′ provided with projecting pins 91, which latter are adapted to actuate a well-known form of counting mechanism 92. (Fig. 1).

*Wind-up mechanism.*—Secured on shaft 72 is a pulley 93 which by means of the belt 94 drives a pulley 95 loose on the shaft 96 (Fig. 6). The pulley 95 on its side face is provided with the spring-pressed friction blocks 97, which are adapted to engage a friction disc 98 pinned on the shaft 96 to thereby drive the latter. Slidably disposed on the free end of shaft 96 is a wind-up roll 99 which is held against lateral slipping by the leaf spring 100 and which is prevented from turning on the shaft by the pin 101 engaging a groove 102 in the roll. In order to cause the even winding of the finished strip on the roll 99 a wind-up guide is provided (Figs. 6 and 10), which comprises a barrel cam 103 mounted on a shaft 104, which latter has secured thereon a sprocket 105 driven by the chain 106 from a sprocket 107 on shaft 72. Disposed in the cam groove 108 is a follower 109 carried on the lower side of a slide 110, to the upper side of which is secured a bracket 111 having mounted therein cooperating guide rolls 112.

*Operation.*—The tank 13 is filled with cement from the main tank 19 and a series of reels 113 of the fabric strip to be cemented are disposed on the arbor 5. The free end of each reel is unwound for a short distance and cemented in order to facilitate its ready connection with the rear end of a preceding reel as the latter is exhausted. The free end of the strip 114 from the first reel is passed down around the left hand side of the guide roll 34 as shown in Fig. 1, then around the rear or right hand side of the feed roll 30, down into the cement tank 13 through opening 35, beneath the roll 36, between the guide 37 and roll 30, and finally between the rolls 27 and 30 to the outside of the tank. This preliminary threading up operation may be readily accomplished while the cover 14 of the tank is held in raised position by the hook 17'. The cover is then closed and the machine started. It will be seen that as the strip passes down into the lower portion of the cement tank and around the roll 36 both sides of the strip will be cemented, and it is then fed out from the tank by the rolls 27 and 30, any surplus cement being scraped from the sides of the rolls by the scrapers 38.

With the drying reel substantially in the position shown in Fig. 8 the end of the freshly cemented strip is secured to the right hand side of one of the lower cross bars 50 of the reel and as the reel rotates the strip is rolled up thereon for drying. Due to the engagement of the split nut with the screw shaft 63 the drying reel is slowly moved to the right as the winding up proceeds, thereby insuring the regular winding of the strip on the reel in adjacent but not overlapping turns. It also at the same time maintains the wind-up point on the reel in proper alignment with the delivery point from the cementing machine. As the left hand side of the drying reel comes in alignment with the cementing machine and the reel is substantially filled with the cemented strip the split nut passes off of the threaded portion of the screw shaft 63, thereby checking the lateral movement of the drying reel. The machine is then stopped and the strip is cut between the drying reel and cementing machine, the split nut opened by means of the handle 62' and the reel moved back to the position shown in Fig. 8, thereby bringing the portion of the strip which was first wound on the reel and which has become suitably dried once more in alignment with the cementing machine and also with the scoring machine disposed above the latter. Something more than one turn of the dried strip, approximately 1½ turns, are unwound from the top of the reel and threaded between the rolls 75 and 87 of the scoring machine. The cut end of the freshly cemented portion of the strip leading from the cementing machine is then once more secured to the lower portion of the drying reel at the point made vacant by the unwrapping of the dried end. The split nut is again engaged with the screw shaft and the machine started as before. The drying reel again moves to the right and as the scoring mechanism withdraws the dried strip from the top of the reel, the freshly cemented strip portion coming from the cementing machine is wound on the lower side of the reel in the space just vacated by the dried strip. It will be seen as a result of this construction that the point of delivery of the dried strip from the reel is always maintained in alignment with the scoring mechanism, and the point of receipt of the freshly cemented strip on the reel is always kept in alignment with the cementing mechanism. The dried strip 114 after being fed between the rolls 75 and 87 is scored or nearly cut through at regular intervals by the score cutters 80 as shown at 115 and then passes to the wind-up mechanism. Any sticking of the scored strip to the roll 75 is prevented by the stripper 90. The scored strip then passes between the guide rolls 112 and on to the wind-up spool or roll 99. By reason of the lateral reciprocatory movement of the guide rolls 112 the strip is regularly wound on the roll 99. As the roll 99 fills and its diameter increases its peripheral speed also tends to increase, which would unduly tension the finished strip and cause breakage thereof, but by reason of the friction drive through the disk 98 the roll 99 can slip sufficiently to maintain an even peripheral winding speed. When the roll 99 is filled the strip is cut, the roll withdrawn from the shaft 96 and a fresh roll substituted.

It will be seen that by my invention practically all manual labor in connection with the preparation of buckle straps has been eliminated, with a consequent great saving in expense, and instead of the operator losing time in the preparation of the straps they are delivered in a continuous strip on the rolls 99 ready to be torn off or separated as required. While a specific embodiment of the invention has been described, it is obvious that numerous details may be changed and it is not limited to the specific use set forth, but may be used wherever it is desired to coat and dry a strip material, and in cases where this material is desired in continuous lengths, the scoring mechanism may be of course omitted.

With the above detailed disclosure in mind, many modifications will suggest themselves to those skilled in the art, and it is not desired to limit the invention otherwise than as set forth in the appended claims.

Having thus described my invention what I claim and desire to protect by Letters Patent is:—

1. A machine for preparing coated strips comprising means for coating the strip, means for drying an extended portion of the coated strip, means for regularly scoring the dried strip, and means for reeling up the finished strip.

2. A machine for preparing coated strips comprising means for coating the strip, a drying reel, means for regularly winding the coated strip thereon to dry, means for unwinding and for scoring the dried strip at regular intervals, and means for reeling up the scored strip.

3. A machine for preparing coated strip material comprising a strip coating device, a strip scoring device, and interposed reeling and drying means for simultaneously winding up a freshly coated portion and delivering a dried portion of the material to the scoring device.

4. A machine for preparing coated strips comprising a strip coating device, a strip scoring device in alignment therewith, a drying reel interposed between the two and receiving the strip material from and delivering it to the respective devices and means whereby the reel may be laterally moved.

5. A machine for preparing coated strips comprising a coating device, means for winding up the coated strip to dry, means for regularly laterally displacing said winding means to dispose the turns of the strip side by side, means for unwinding and scoring the dried strip, and means for winding up the scored strip.

6. A machine for preparing coated strips comprising a coating device, means for winding up the coated strip to dry, means for regularly laterally displacing said winding means to dispose the turns of the strip side by side, means whereby the winding means may be returned to its initial position, means for unwinding and scoring the dried strip, and means for regularly winding up the scored strip.

7. A machine for preparing coated strips comprising a strip coating device, a drying reel for the reception of the coated strip, a dried-strip scoring device supplied from said reel, and means whereby the coated strip being wound on the reel and the dried strip being unwound therefrom may be maintained substantially in alignment with the coating and scoring devices.

8. A machine for preparing coated strips comprising a strip coating device, a strip scoring device in alignment therewith, a drying reel interposed between the two and receiving the strip material from and delivering it to the respective devices, and means whereby the points of delivery to and discharge from the reel may be maintained substantially in alignment with said aligned devices.

9. A machine for preparing coated strips comprising a strip coating device, a strip scoring device in alignment therewith, a drying reel interposed between the two and receiving the strip material from and delivering it to the respective devices, and means whereby the strip receiving and delivery points on the reel may be varied.

10. A machine for preparing coated strip material comprising a strip coating device, a strip scoring device, an interposed strip drying reel, means for actuating said previously named parts in unison, a laterally movable carriage on which said reel is mounted, and means operable from said actuating means for imparting lateral movement to said carriage.

11 A machine for preparing coated strips comprising a cement tank, guide means for directing a strip into the tank, a pair of cooperating knurled feed rolls for withdrawing the strip, one of said rolls being resiliently mounted, and scrapers for removing surplus cement disposed at the sides of said rolls.

12. A machine for preparing coated strips comprising a cement tank having a cover, a pair of ridged and knurled cooperating feed rolls for withdrawing the strip disposed on said cover and projecting into said tank, one of said rolls being resiliently mounted, and guide rolls for directing the strip into the tank.

13. A machine for preparing coated strips comprising a cement tank having a movable cover, a ridged and knurled strip feed roll mounted on the cover and projecting into the tank, a similar roll swingingly mounted on the cover, a spring for urging the second roll toward the first, a guide roll above the tank, a strip guiding and spacing roll disposed within the tank, a strip guide disposed adjacent said feed rolls, and means for actuating said feed rolls.

14. A machine for preparing coated strips comprising means for coating a strip, means for drying an extended portion of the coated strip, means for scoring the strip including a driven smooth roll, a cooperating rotary score cutter driven in unison therewith, and means for regularly reeling up the finished strip.

15. A machine for preparing coated strips comprising means for coating a strip, means for drying the coated strip, means for scoring the strip including a driven smooth roll, a cooperating rotary score cutter driven in unison therewith, means for relatively adjusting said roll and cutter, and frictionally driven means for reeling up the finished strip.

16. A machine for preparing coated strips comprising means for coating a strip, means for drying the same, means for scoring the strip including cooperating rotary score cutting elements, a wind up roll, and an interposed winding guide including a pair of guide rolls and a laterally movable support for said guide rolls Signed at New Haven, county of New Haven, and State of Connecticut, this 27 day of September, 1923.

EUGENE E. CLEMENTS.